United States Patent
Kanazawa

[11] Patent Number: 6,055,895
[45] Date of Patent: May 2, 2000

[54] PUNCHED PLATE MATERIAL CARRYING-OUT SYSTEM

[75] Inventor: Masato Kanazawa, Buena Park, Calif.

[73] Assignee: Amada America, Inc., La Mirada, Calif.

[21] Appl. No.: 08/975,715

[22] Filed: Nov. 21, 1997

Related U.S. Application Data

[62] Division of application No. 08/538,653, Oct. 4, 1995, abandoned.

[51] Int. Cl.[7] .................................. B26D 7/32; B23Q 7/04
[52] U.S. Cl. ...................... 83/24; 83/29; 83/39; 83/73; 83/76.9; 83/86; 83/76.1; 83/100; 83/152; 83/167; 83/94; 414/752; 901/40
[58] Field of Search .................................. 83/23, 24, 27, 83/29, 32, 39, 73, 76.1, 76.6, 76.9, 76.8, 86, 87, 94, 100, 102, 103, 151, 152, 153, 161, 167, 72; 198/468.4, 468.6; 225/96.5; 414/752, 627; 294/65; 901/40

[56] References Cited

U.S. PATENT DOCUMENTS

| | | | |
|---|---|---|---|
| 3,449,991 | 6/1969 | Daniels | 83/76.9 |
| 4,040,318 | 8/1977 | Makeev et al. | 83/76.8 |
| 4,140,258 | 2/1979 | Gray | 225/2 |
| 4,183,427 | 1/1980 | Tomikawa | 198/464.1 |
| 4,187,545 | 2/1980 | Wallace et al. | 356/386 |
| 4,249,438 | 2/1981 | Kelley | 83/167 X |
| 4,278,377 | 7/1981 | Elineau | 414/788.2 |
| 4,361,062 | 11/1982 | Reiff | 83/76.9 |
| 4,362,461 | 12/1982 | Cathers | 414/752 |
| 4,487,409 | 12/1984 | Orii | 271/267 |
| 4,628,781 | 12/1986 | Rowley | 83/371 |
| 4,950,128 | 8/1990 | Sala | 414/796.9 |
| 4,978,275 | 12/1990 | Reid et al. | 414/752 X |
| 5,036,736 | 8/1991 | Hillock et al. | 83/24 X |
| 5,120,178 | 6/1992 | Ito | 414/225 |
| 5,452,981 | 9/1995 | Crorey et al. | 414/225 |
| 5,555,763 | 9/1996 | Takeshita | 72/420 |

FOREIGN PATENT DOCUMENTS

| | | |
|---|---|---|
| 0106056 | 4/1984 | European Pat. Off. . |
| 3504586 | 8/1986 | Germany . |
| 0 152 315 | 7/1986 | Japan ......................................... 83/27 |

*Primary Examiner*—Rinaldi I. Rada
*Assistant Examiner*—Boyer Ashley
*Attorney, Agent, or Firm*—Greenblum & Bernstein, P.L.C.

[57] ABSTRACT

A slider of the punch carry out unit is moved in the X-axis direction adjacent a punching section of the punch press machine before or after a plate material is punched into a punched product by a punch press machine. At the same time, a gravity center and a shape of the punched product are calculated and recognized on the basis of the manufacturing data. On the basis of the obtained gravity center and the shape of the punched product, the gravity center of the punched product is moved under the lift arm by the X- and Y-axis locating mechanism. Vacuum pads located just over the punched product are selected or discriminated. Then, the lift arm is lowered and the punched product is held by actuating only the discriminated vacuum pads. During this lift motion, it is preferable to bend one end of the punched product slightly upward to easily separate the punched product from the remaining flat plate material. After the punched product has been lifted, the punched product is moved horizontally away from the punch press, and is then lowered on the punched product supporting unit by releasing only the actuated vacuum pads. Since only the vicinity of the gravity center of the punched product is held by a minimum possible number of the vacuum pads, irrespective of the size and shape of the punched products, the number of the vacuum pads can be reduced.

7 Claims, 8 Drawing Sheets

PUNCHED PLATE MATERIAL CARRYING-OUT SYSTEM

This application is a division of application Ser. No. 08/538,653, filed Oct. 4, 1995, abandoned.

BACKGROUND OF THE INVENTION

1. Field of the Invention

The present invention relates to a punched plate material carrying-out system, and more specifically to a system for carrying out a plate material punched by a processing machine (e.g., a punch press machine, laser processing machine, etc.) onto a punched product supporting unit (e.g., table).

2. Description of the Prior Art

A conventional punched plate material carrying-out system will be first explained hereinbelow. The system is provided with a punch press machine (as an example of the hole-forming machines). The punch press machine has a punching section for punching at least one punch hole at any desired portion in a plate material (work) to manufacture a punched product, and a plate material locating mechanism for locating the plate material at a correct punching position.

Further, after the plate material has been punched out as a punched product, the punched plated material (i.e., punched product) must be carried out from the punch press machine to the outside (e.g., a punched product supporting table). For this purpose, a guide member extending in an X-axis direction (e.g., a longitudinal direction of the plate material (work)) is provided near the punch press machine in such a way that a part of the guide member reaches the vertical portion of the punch press machine. A slider is usually mounted on the guide member so as to be movable in the X-axis direction, and further a lift frame is attached to this slider movably up and down. Further, a number of vacuum pads are arranged at regular intervals along the bottom surface of the, lift frame to suck all over the upper surface of the punched plate material (punched product). These vacuum pads can be switched from a suction status to a non-suction status or vice versa, respectively. In the prior art punched plate material carrying-out system, however, in order to uniformly suck all over the upper surfaces of the punched products of various sizes, a plurality of vacuum pads are arranged in the lift frame at roughly regular intervals both in the X- and Y-axis directions. Here, the number of the vacuum pads is determined large so that the punched products of the maximum sizes can be sucked for lifting.

In operation, first a plate material is shifted and located at the plate material punching position by moving it in both X- and Y-axis directions by the plate material locating mechanism, and then the located plate material is punched out at any desired portion of the plate material to manufacture a plate punched product.

After or when the punching is accomplished, the slider is moved to over the punching position; the lift frame is lowered to bring a number of the vacuum pads (determined according to the maximum product size) attached to the lift frame into contact with the upper surface of the punched products at roughly regular intervals; the vacuum pads are switched from the non-suction status to the suction status to suck all over the upper surface of the punched product. After that, the lift frame (i.e., a number of the vacuum pads) is lifted to move the punched product upward. After the punched product has been moved upward, the slider is moved in the X-axis direction away from the punch press machine, and then mounted on an appropriate product support table. Thereafter, the vacuum pads are switched to the non-suction status to release the sucked punched product onto the product support table.

In the conventional punched plate material carrying-out system as described above, however, since a great number of vacuum pads are arranged in both X- and Y-axis directions roughly at regular intervals on the lift frame so that the punched product of the maximum size can be sucked, that is, in order to suck all over the surfaces of various products of different sizes, there exists a problem in that the number of vacuum pads increases. As a result, the mechanism of the punched plate material carrying-out system is complicated with increasing number of vacuum pads, thus causing a problem in that the manufacturing cost of the punched plate material carrying-out system is relatively high. In addition, since the sizes of the slider, the guide members, etc. increase with increasing number of the vacuum pads, another problem arises in that the system size is excessively large.

SUMMARY OF THE INVENTION

With these problems in mind, therefore, it is the object of the present invention to provide a punched plate material carrying-out system, which can reduce the number of vacuum pads to simplify the punched plate material carrying-out system and thereby to reduce the total size and the total manufacturing cost of the system.

To achieve the above-mentioned object, the present invention provides a punched plate material carrying-out system, comprising: a punching machine (3) having a punching section (15) for punching a plate material (W) and a plate material locating mechanism (23) for shifting the plate material in both horizontal X- and Y-axis directions; and punched plate material carrying-out means (7) including: a guide member (45) extending in the X-axis direction from over the punching section of said punching machine; a slider (51) attached to said guide member slidably in the X-axis direction along said guide member; first and second actuation cylinders (67, 71) attached to said slider; a lift arm (59) extending in the X-axis direction and supported by said first and second actuation cylinders, said lift arm being moved up and down by said said first and second actuation cylinders, respectively; a plurality of punched plate material holding members (79) arranged at regular intervals on a bottom surface of said lift arm to hold the punched plate material (WA); a gravity center calculating section (91) for calculating a gravity center of the punched plate material on the basis of manufacturing data; and a location control section (93) for controlling the plate material locating mechanism (23) in both horizontal X- and Y-axis directions on the basis of the calculated gravity center, so that the gravity center of the punched plate material can be located Just under some of said punched plate material holding members attached to said lift arm (59), the punched plate material (WA) being held by some of said actuated punched plate material holding members (79) and further carried out from said punching machine by said slider along said guide member.

Further, it is preferable that the system further comprises: a shape recognition section (95) for recognizing a shape of the punched plate material (WA) on the basis of the manufacturing data; a holding member or pad discriminating section (97) for discriminating which plate material holding members are located over the punched plate material on the basis of the recognized shape of the punched plate material; and a holding members or pad control control section (99)

for actuating only the holding members discriminated as locating over the punched plate material, to hold the punched plate material (WA), before or after said holding members arranged on said lift arm are lowered into contact with the punched plate material by said first and second cylinders.

Further, the gravity center of the punched plate material is located under some of said punched plate material holding members in such a way that at least one of the outermost holding member ($79_1$) can hold an outermost end of the punched plate material (WA) when seen along the X-axis direction.

Further, said holding members (79) are a plurality of vacuum pads arranged at regular interval on the bottom surface of said lift arm in the X-axis direction, each vacuum pad being switched from a suction status to a non-suction status or vice versa by an air supply circuit composed of an air source (83), an air switch valve (85) and an air ejector (87).

Further, a plurality of said holding members (79) are arranged in a single line or a plurality of lines along a longitudinal direction of said lift arm.

Further, said lift arm (59) is composed of a horizontal lift arm (61) and a pivotal lift arm (65) pivotal relative to said first lift arm, said horizontal lift arm being lifted upward in horizontal status relative to the punched plate material and said second lift arm being pivoted upward in oblique status relative to the punched plate material, to facilitate separation of the punched plate material (WA) from the plate material (W).

Further, it is preferable that the system further comprises a punched plate material supporting unit (5) arranged in the vicinity of said punching machine, for supporting the carried-out punched plate material thereof, said guide member (45) being extending between said punching machine (3) and said punched plate material supporting unit (5).

Further, said punching machine is a punch press machine having a punching section composed of an upper turret and a lower turret, and the punched plate material is a punched product punched out from the plate material. And said punched plate material holding members are electromagnets.

Further, the present invention provides a method of carrying-out a product punched out by a punch press machine, which comprises the steps of: punching out a plate material to manufacture a punched product; moving a slider (51) provided with a lift arm (59) vertically movably supported by first and second cylinders (67, 71) and further having a plurality of vacuum pads (79), from a punched product support position to a punched product carry-out position near the punch press machine; calculating a gravity center of a punched product on the basis of product manufacturing data; recognizing a shape of the punched product on the basis of the product manufacturing data; moving the punched product in both X- and Y-axis direction by an X- and Y-axis locating mechanism of the punch press machine, so that the gravity center of the punched product can be located just under some of the vacuum pads arranged on a bottom surface of the lift arm (59); discriminating which vacuum pads are located over the punched product; actuating the first and second actuation cylinders to lower the lift arm so that the vacuum pads are brought into contact to an upper surface of the punched product; actuating only the vacuum pads located Just over the punched product to hold the punched product; actuating the first and second actuation cylinders to move the lift arm upward away from the plate material; and moving the slider away from the punched product carry-out position to the punched product support position.

Further, the gravity center of the punched plate material is located under some of the vacuum pads in such a way that at least one of the outermost vacuum pad ($79_1$) can hold an outermost end of the punched product (WA) when seen along the X-axis direction.

Further, after vacuum pads located over the punched product are discriminated, the punched product can be moved in both X- and Y-axis direction by the X- and Y-axis locating mechanism of the punch press machine, so that the gravity center of the punched product can be located Just under some of the vacuum pads arranged on the bottom surface of the lift arm.

Further, after the slider (51) has been moved from a punched product support position to the punched product carry-out position, the plate material can be punched out to manufacture the punched product.

Further, after only the vacuum pads located just over the punched product have been actuated so as to hold the punched product, the first and second actuation cylinders can be actuated to lower the lift arm so that the vacuum pads are brought into contact to an upper surface of the punched product.

Further, in the step of moving the lift arm upward away from the plate material, only the second actuation cylinder (71) is actuated by a larger stroke to bend one end of the punched product upward relative to the plate material for easy separation of the punched product from the remaining flat plate material.

Further, it is preferable that the method further comprises the steps of: moving the slider which holds the punched product by the vacuum pads via the lift arm, to a punched product support unit installed at the punched product support position; and deactuating the vacuum pads to release the carried punched product onto the punched product support unit.

In the punched plate material carrying-out system and method according to the present invention, before or after a plate material is punched out into a punched product by a punch press machine, the slider of the punch carry out unit is moved in the X-axis direction to near a punching section of the punch press machine. At the same time, a gravity center and a shape of the punched product are calculated and recognized on the basis of the manufacturing data. On the basis of these obtained gravity center and the shape of the punched product, the gravity center of the punched product is moved under the lift arm by the X- and Y-axis locating mechanism of the punch press. Further, the vacuum pads located just over the punched product are selected or discriminated. After that, the lift arm is lowered and further the punched product is held by actuating only the discriminated vacuum pads. In this lift motion, it is preferable to bend one end of the punched product slightly upward to separate the punched product easily from the remaining flat plate material. After the punched product has been lifted, the punched product is moved in horizontally away from the punch press machine, and then lowered on the punched product supporting unit by releasing only the actuated vacuum pads.

As described above, in the punched plate material carrying-out system according to the present invention, since the vacuum pads can suck only the vicinity of the punched product, irrespective of the shape and the size of the punched product WA, it is unnecessary to arrange a great number of vacuum pads both in the X- and Y-axis directions in a wide range so as cover all over the upper surface of the product WA of the maximum size. As a result, it is possible to reduce the number of vacuum pads and simplify the punched product carrying-out unit, thus reducing the cost thereof. In particular, since the slider and the guide member, etc. can be compacted, it is possible to reduce the size of the entire punched plate material (product) carrying-out system, thus economizing the installation space required for the system in a factory.

In addition, after the upper surface of the punched product has been sucked in the vicinity of the gravity center thereof, the left side of the punched product is further bent or curved upward, the punched product can be separated from the plate material W easily, so that It is possible to improve the working efficiency of the punched product carrying-out work for the plate material processing machine.

DETAILED DESCRIPTION OF THE EMBODIMENTS

The punched plate material carrying-out system according to the present invention will be explained hereinbelow, by taking the case where a plate material (work) is punched out to a punched plate material (referred to as a punched product) by a punch press machine. However, a plate material can be punched off by user of a laser processing machine.

Figure 1:
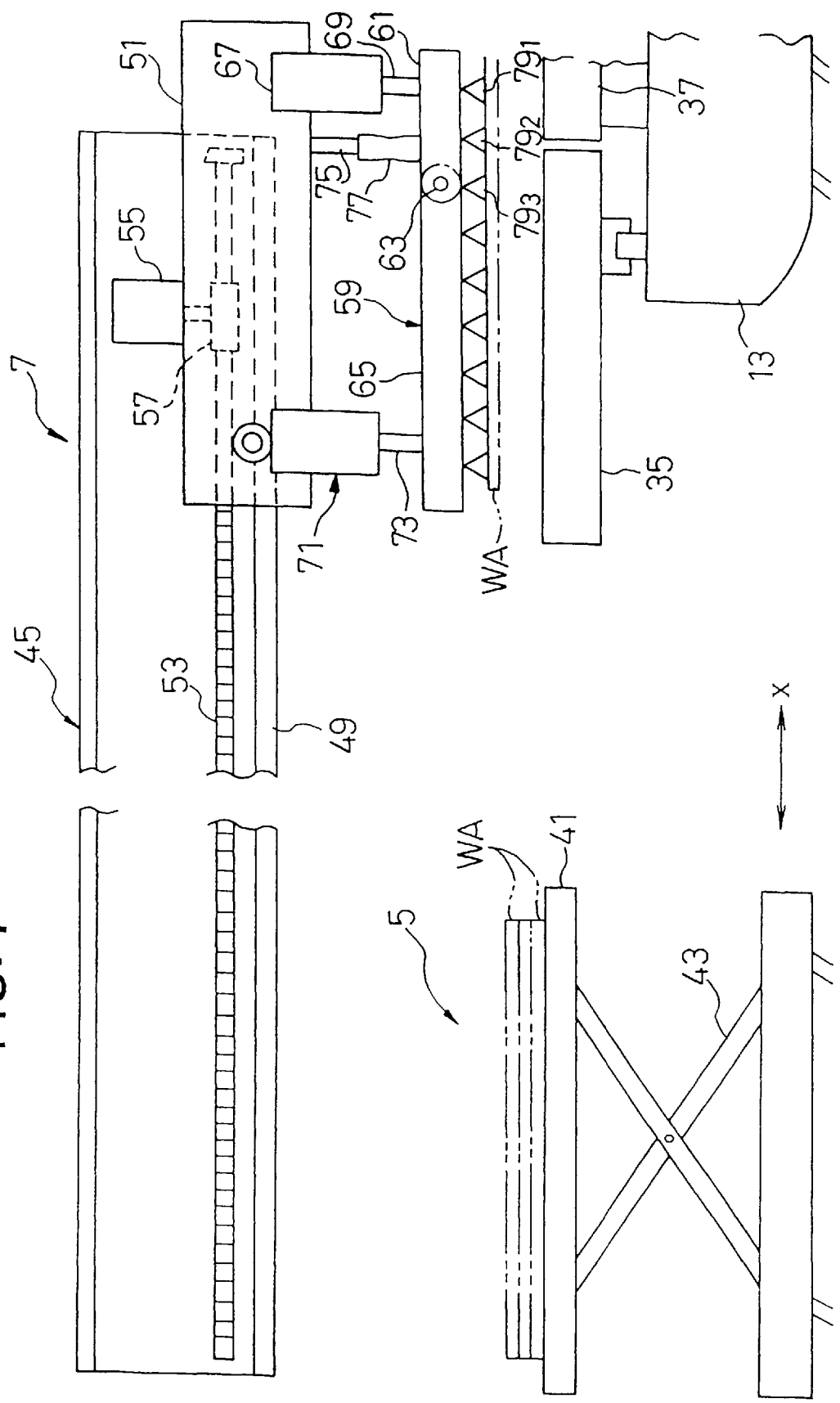
FIG. 1 is a cross-sectional view showing a punched plate material carrying-out system according to the present invention, taken along the line I—I in FIG. 2.
Figure 2:
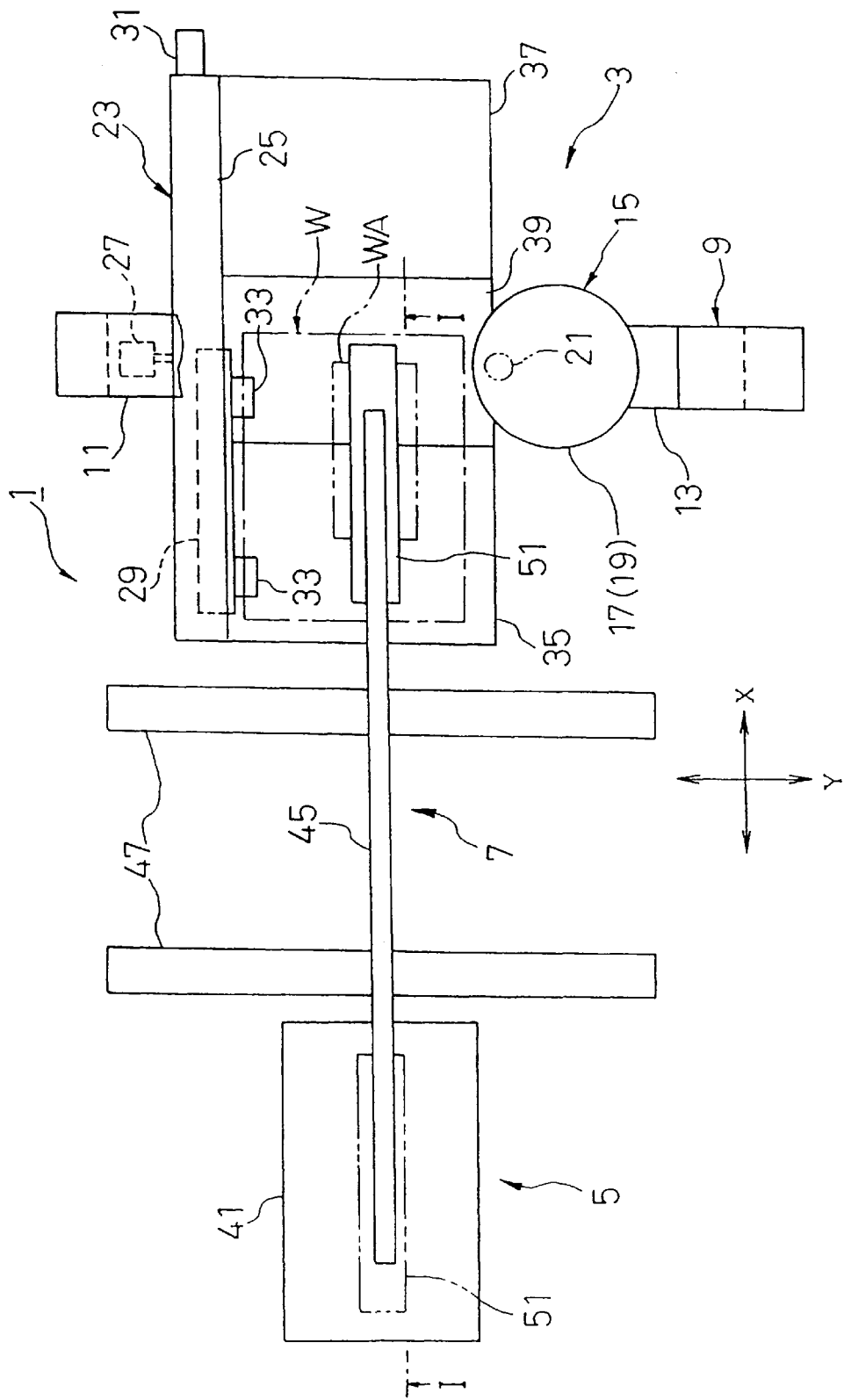
FIG. 2 is a plane view showing the punched plate material carrying-out system according to the present invention shown in FIG. 1.

With reference to FIGS. 1 and 2, the punched plate material carrying-out system according to the present invention is roughly composed of a punch press machine 3 for punching a plate material (work) W into a punched product WA, a product support unit 5 arranged in the vicinity (on the left side in FIGS. 1 and 2) of the punch press machine 3, and a product carry-out unit 7 interposed between the punch press machine 3 and the product support unit 5. The product support unit 5 can support a plurality of punched products WA, and the product carry-out unit 7 can take out the punched product WA from the punch press machine 3 and further carries and mounts the punched product WA onto the product support unit 5.

The punch press machine 3 will be briefly explained hereinbelow. The punch press machine 3 has a base frame 9 (shown in FIG. 2) having an upper frame 11 and a lower frame 13 so as to be opposed to each other in the vertical direction (in the perpendicular direction to the paper in FIG. 2).

On the front side of the body frame 9, there is arranged a punching section 15 for punching any desired portion of a plate material W into a punched product WA. The punching section 15 is provided with an upper turret 17 for supporting a plurality of punches (not shown), a lower turret 19 for supporting a plurality of dies (not shown), and a ram 21 for striking any desired punch located at the punching position 15 from above. Here, the constructions of the upper turret 17, the lower turret 19, and the ram 21 are all well known, so that any detailed description thereof is omitted herein.

On the lower frame 13, a plate material locating section mechanism 23 is provided to shift and locate the plate material W to the punching position in both X- and Y-axis directions. In more detail, the lower frame 13 is provided with a Y-axis carriage 25 extending in the X-axis direction and moved in the Y-axis direction by a Y-axis servomotor 27. Further, the Y-axis carriage 25 is provided with an X-axis carriage 29 also extending in the X-axis direction and moved in the X-axis direction by an X-axis servomotor 31. Further, a plurality of clamps 33 for clamping the plate material W are provided for the X-axis carriage 29.

Further, on front side of the Y-axis carriage 25 (on the lower side in FIG. 2), a pair of right and left movable tables 35 and 37 are provided integral with each other, and a fixed table 39 (fixed to the lower frame 13) is interposed between the two movable tables 35 and 37.

The product support unit (table) 5 is composed of a product support base 41 for supporting a plurality of punched products WA and a link mechanism 43 for moving up and down the product support base 41. Further, when the link mechanism 43 is moved up and down by means of any appropriate drive mechanism (motor, hydraulic pump, etc.), it is possible to keep the outermost punched product WA mounted on the product support base 41 always at a constant height.

The punched product carry-out unit 7 will be described in detail hereinbelow, which is interposed between the punch press machine 3 and the product support unit 5. The punched product carry-out unit 7 is mainly composed of a guide member 45, a slider 51 slidable along the guide member 45, a lift arm 59 supported by the slider 51 via a first actuation cylinder 69 and a second actuation cylinder 71 and a plurality of vacuum pads 79. In more detail, the guide member 45 extending in the X-axis direction is supported by a plurality of support frames 47 (shown in FIG. 2) between the punch press machine 3 and the product support unit 5. The right end portion of the guide member 45 extends over the punch press 3 and the left end portion of the guide member 45 extends over the product support unit 5. The slider 51 is mounted on a rail portion 49 formed in the guide member 45. Accordingly, this slider 51 can be moved in the X-axis direction between over the product carry-out position (shown by solid lines in FIG. 2) of the punch press machine 3 and over the product support position (shown by dashed lines in FIG. 2) of the product support unit 5. To move the slider 51 in the X-axis direction, the guide member 45 is formed with a rack extending in the X-axis direction. On the other hand, a mobile motor 55 is mounted on the slider 51 and a pinion 57 driven by this mobile motor 55 is in mesh with this rack 53 of the guide rail 49. Therefore, when the mobile motor 55 is driven, the slider 51 can be moved in the X-axis direction along the guide member 45 via a mesh between the rack and pinion mechanism.

On the other hand, the lift arm 59 extending also in the X-axis direction is attached to the slider 51 so as to be moved up and down relative to the slider 51 via two actuation cylinders 67 and 71. This lift arm 59 is composed of a horizontal lift arm 61 and a pivotal lift arm 65 pivotal around a connection pin 63 provided on the left side end of the horizontal lift arm 61. Further, in order to keep the horizontal lift arm 61 roughly horizontally, a guide bar 75 extends downward from the lower surface of the slider 51, and further a lift sleeve 77 is attached on the upper surface of the horizontal lift arm 61 to support the guide bar 75 always in the vertical direction by the lift sleeve 77. Further, the first actuation cylinder 67 is provided on the right end of the slider 51 and the second actuation cylinder 71 is provided on the left end of the slider 51. A piston rod 69 of the first actuation cylinder 67 is linked with the right end of the horizontal lift arm 61, and a piston rod 13 of the second actuation cylinder 71 is linked with the left end of the pivotal lift arm 65.

A plurality of vacuum pads $79_1, 79_2, \ldots, 79_n$ for sucking the upper surface of the punched product WA are attached on the bottom surface of the lift arm 59. As shown in FIGS. 5A and 5B and 6A–6F, a plurality of vacuum pads $79_1, 79_2, \ldots, 79_n$ are arranged at appropriate intervals at two lines in the X-axis direction. However, it is possible to arrange these vacuum pads in a single line or three lines at regular intervals in the X-axis direction, without being limited only to the two lines as shown.

Figure 3:
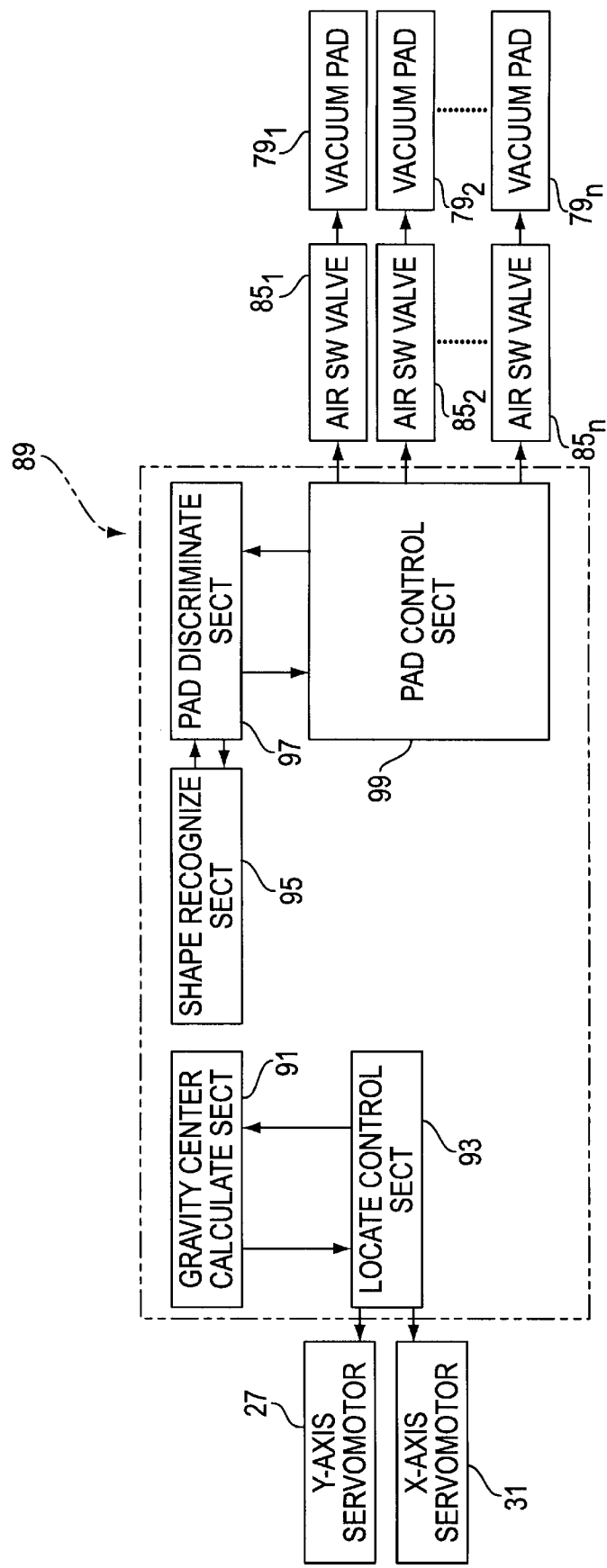
FIG. 3 is a schematic block diagram showing an NC control system used with the punched plate material carrying-out system according to the present invention.
Figure 4:
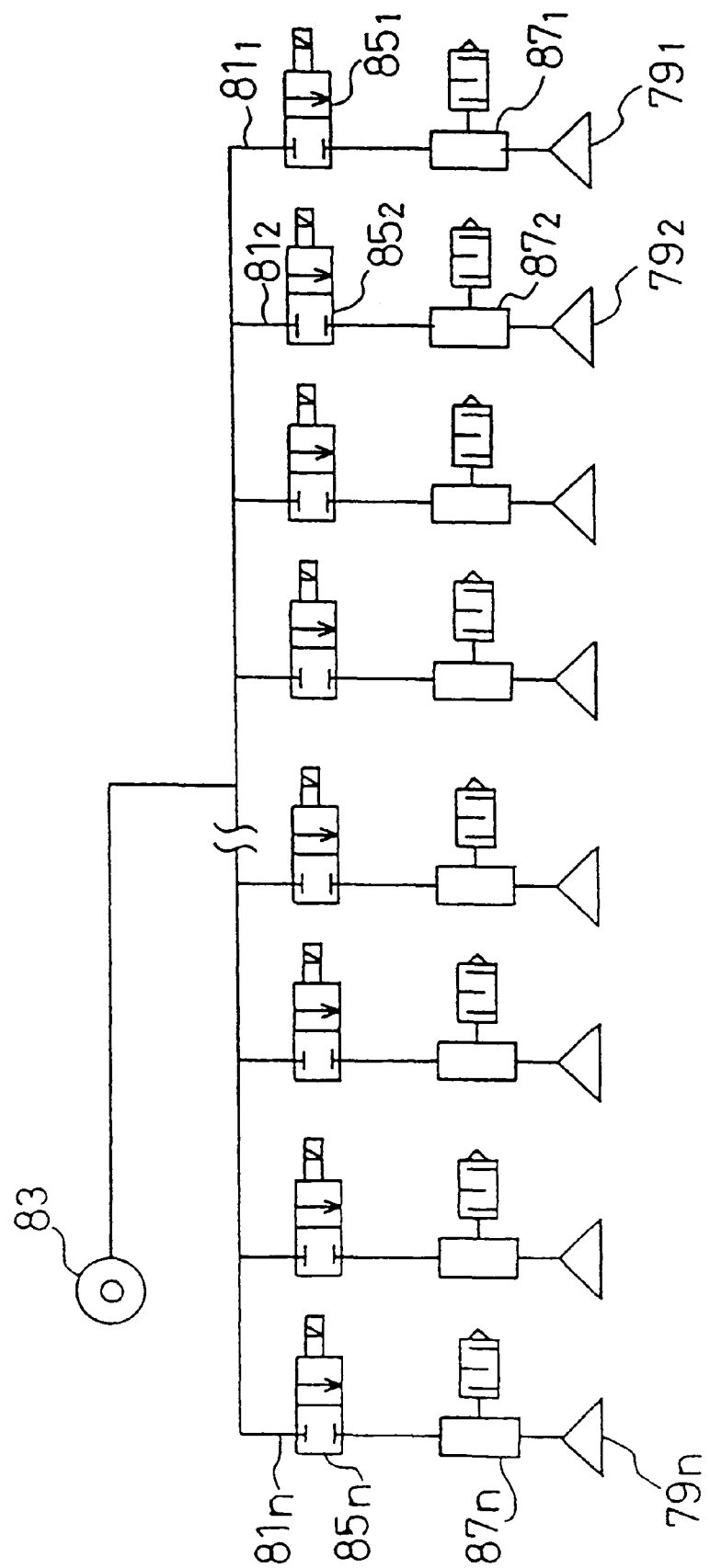
FIG. 4 is an air circuit diagram for actuating a plurality of vacuum pads, separately.
Figure 5A:
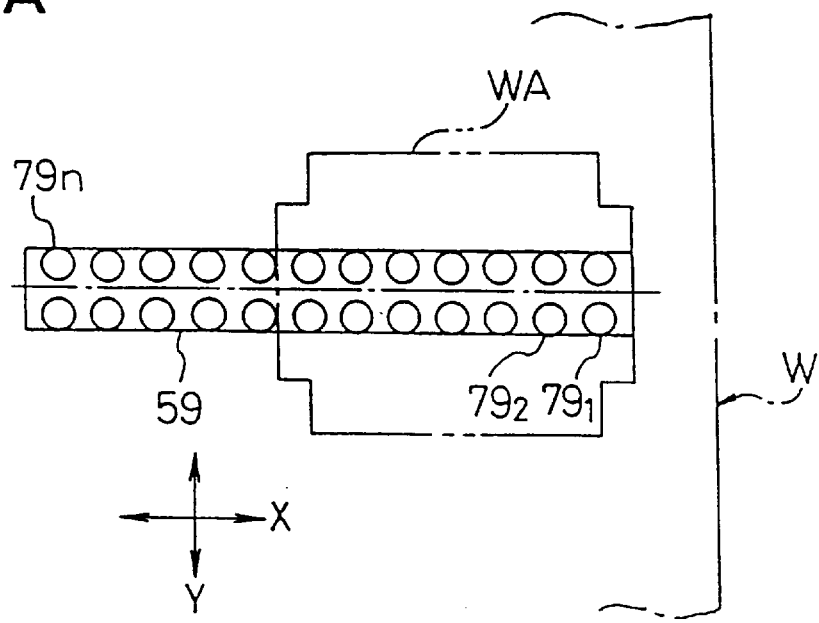
FIG. 5A is an illustration for assistance in explaining an example of the positional relationship between the arrangement of the vacuum pads and a punched product.
Figure 5B:
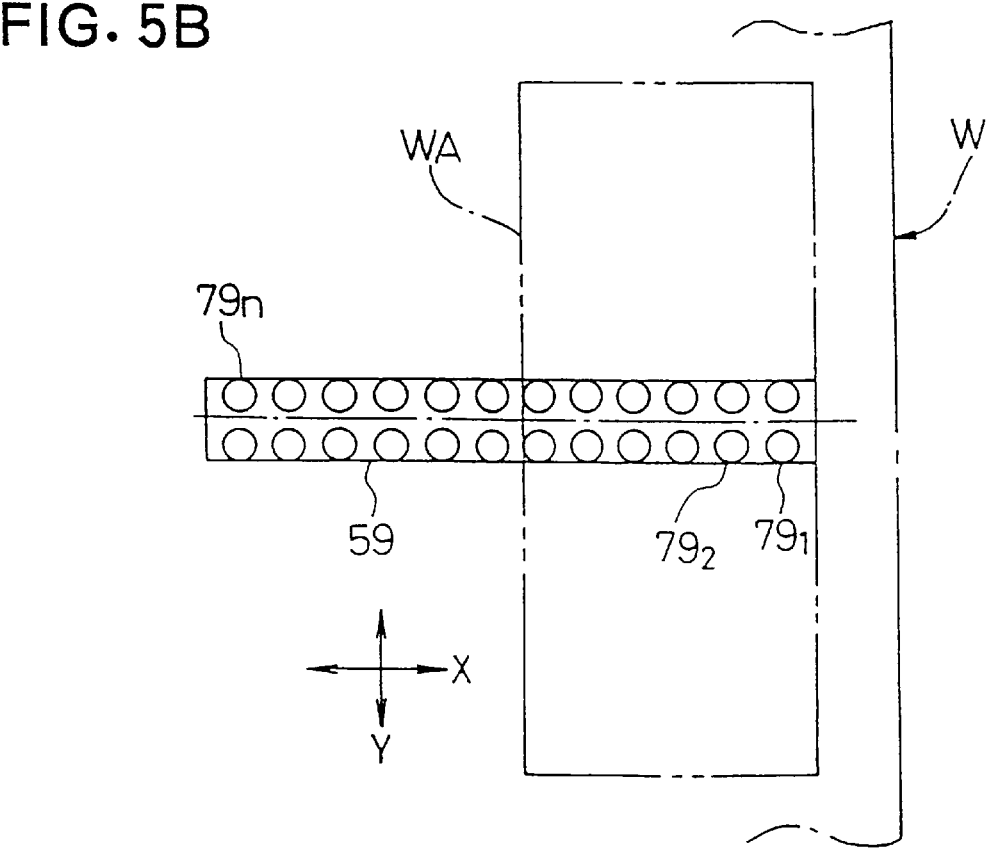
FIG. 5B is an illustration for assistance in explaining another example of the positional relationship between the arrangement of the vacuum pads and another punched product.

FIG. 4 shows an air circuit for switching these vacuum pads $79_1, 79_2, \ldots, 79_n$ from the suction status to the non-suction status or vice versa. The air circuit comprises an air supply source 83. That is, each of the vacuum pads $79_1, 79_2, \ldots, 79_n$ is connected to the air supply each of air pipes $81_1, 81_2, \ldots, 81_n$; each of switch values $85_1, 85_2, \ldots, 85_n$; and each of air ejector $87_1, 87_2, \ldots, 87_n$, independently. Therefore, when each switch value 85 is opened, since air is supplied from the air source 83 to the air vacuum pads 79 via the air ejector 87, respectively, the vacuum pads 79 can be actuated into the suction status in which the plate material WA can be sucked by the vacuum pads 79. Here, it is of course possible to use a vacuum pump as the air supply source 83, With reference to FIG. 3, the punched product carrying-out system according to the present invention 1 is provided with an NC control system 89 for allowing a predetermined number of vacuum pads to suck the upper surface of the punched product WA only near a gravity center thereof. That is, the NC system 89 is composed of a gravity center calculate section 91, a locate control section 93, a shape recognize section 95, a pad discriminate section 97, and a pad control section 99. The gravity center calculate section 91 calculates coordinates of the center of gravity of the punched product WA on the basis of the product manufacturing data. The locate control section 93 controls the X- and Y-axis servomotors 27 and 31 on the basis of the calculated gravity center coordinates of the punched product WA in such a way that the gravity center of the punched product WA can be located Just under the lift arm 59, when the slider 51 is positioned at the punched material take-out position (on the right side (shown by solid lines) in FIG. 2).

The shape recognize section 95 recognizes the shape of the punched product WA on the basis of the product manufacturing data. The pad discriminate section 97 discriminates which vacuum pads $79_1, 79_2, \ldots, 79_n$ are located over the product WA on the basis of the product shape whenever the gravity center of the punched product WA is located Just under the lift arm 59 (at the product carry-out position). In addition, the pad control section 99 controls a plurality of switch valves $85_1, 85_2, \ldots, 85_n$ so that only the vacuum pads 79 located over the product WA can be switched from the non-suction status to the suction status.

Here, the product processing data imply the coordinates of a plurality of corners of the product WA in the case of a square product, center coordinates and a diameter (or a radius) of the product WA in the case of a circular product WA, etc. Further, the coordinates of the gravity center are determined on the basis of the origin of coordinate-axes of the plate material W. Further, the origin of coordinate-axes of the plate material W is determined on a predetermined corner (e.g., a rear left side corner) of the plate material W.

Further, in the above-mentioned description, the punched product WA is not limited to only a single punched product perfectly cut away from the plate material W, but includes a plurality of punched products still connected to each other via narrow connecting portions still connecting to the plate material W (without cut off away perfectly).

The operation of the above-mentioned punched product (punched plate material) carrying-out system according to the present invention will be explained hereinbelow.

First, the end portions of a plate material W are first clamped by a plurality of the clamps 33. The clamped work W is moved by the Y-axis carriage 25 together with the movable tables 35 and 37 in the Y-axis direction by activating the Y-axis servomotor 27, and further moved by the X-axis carriage 29 in the X-axis direction by activating the X-axis servomotor 31. That is, the plate material W is moved to the punching position correctly between the upper turret 17 and the lower turret 19 by moving the plate material w in both X- and Y-axis directions by the plate material locating mechanism 23. Further, the upper and lower turrets 17 and 19 are both indexed in synchronism with each other so that any desired pair of punch and die can be indexed just under the ram 21. Under these conditions, when the ram 21 is lowered, since the desired punch strikes the plate material W against the die at a predetermined punching position (e.g., a peripheral portion or portions in the plate material W), a punched hole can be formed or a punched product WA can be separated from the plate material W.

Before or after the plate material W is punched to manufacture a punched product WA, the mobile motor 55 mounted on the slider 51 is activated to move the slider 51 rightward in the X-axis direction from the product support unit 5 to the punch press machine 3. That is, the carrying-out unit 7 is moved from the product support position as shown in FIG. 6F to the product carry-out position (as shown in FIG. 6A).

After that, the gravity center calculate section 91 calculates the coordinates of the gravity center of the punched product WA on the basis of the product manufacturing data. Further, the shape recognize section 95 recognizes the product shape on the basis of the product manufacturing data. The pad discriminate section 97 discriminates (or selects) the vacuum pads $79_1, 79_2, \ldots, 79_n$ locating over the punched product WA on the basis of the product shape on condition that the slider 51 is located at the product carry-out position and further that the gravity center of the punched product WA is located just under the lift arm 59. Here, in this embodiment, the location of the gravity center of the punched product WA just under the lift arm 59 implies that the gravity center of the punched product WA along the Y-axis direction roughly matches the gravity center of the lift arm 59 also along the Y-axis direction and in addition that the rightmost end of the punched product WA roughly matches the rightmost end of the lift arm 59, as shown in FIGS. 5A–6F, respectively. Further, here, the vacuum pads located just over the punched product WA are denoted by 79'.

Figure 6A:
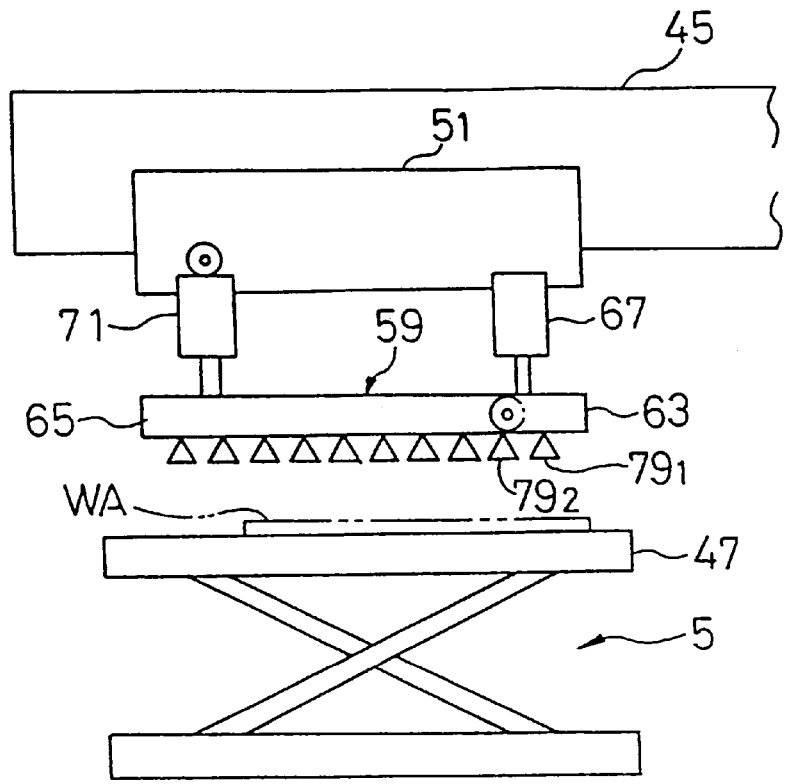
FIGS. 6A to 6F are illustrations for assistance in explaining the operation sequence of the punched plate material carrying-out system according to the present invention.
Figure 6B:
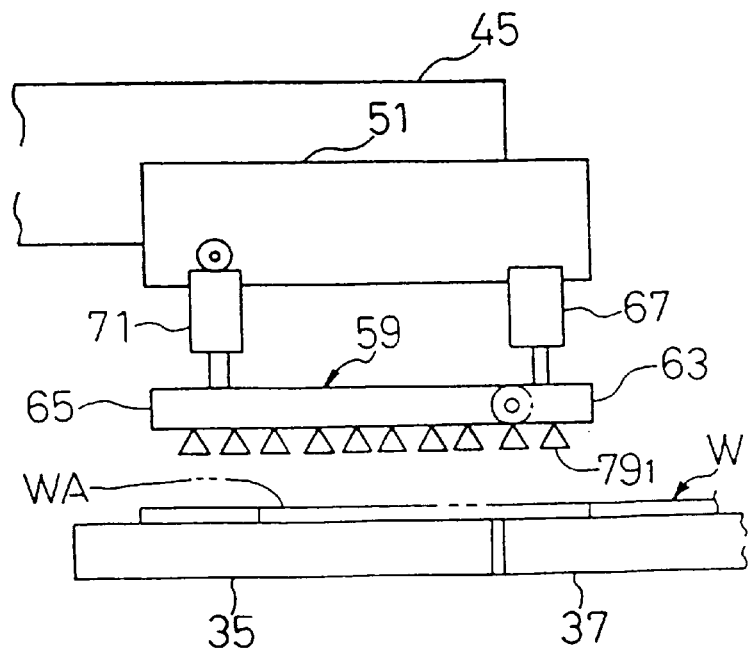

After the plate material W has been punched and further after the slider 51 has been moved to the product carry-out position, the locate control section 93 controls the X- and Y-axis servomotors 31 and 27 so that the gravity center of the punched product WA can be located just under the lift arm 5 on the basis of the calculated gravity center of the punched product WA, as shown in FIG. 6A. After that, the first and second actuating cylinders 67 and 69 move a plurality of the vacuum pads $79_1, 79_2, \ldots, 79_n$ downward, so that a plurality of the vacuum pads can be brought into contact with the punched products WA in the vicinity of the gravity center thereof, as shown in FIG. 6B. Further, the pad control section 99 switches only a plurality of the switch valves to switch only the vacuum pads 79' from the non-suction status to the suction status. As a result, a plurality of the vacuum pads 79' suck the upper surface of the punched product WA in the vicinity of the gravity center thereof. Further, it also possible to switch the vacuum pads 79' from the non-suction status to the suction status before being brought into contact with the upper surface of the punched product WA.

Figure 6C:
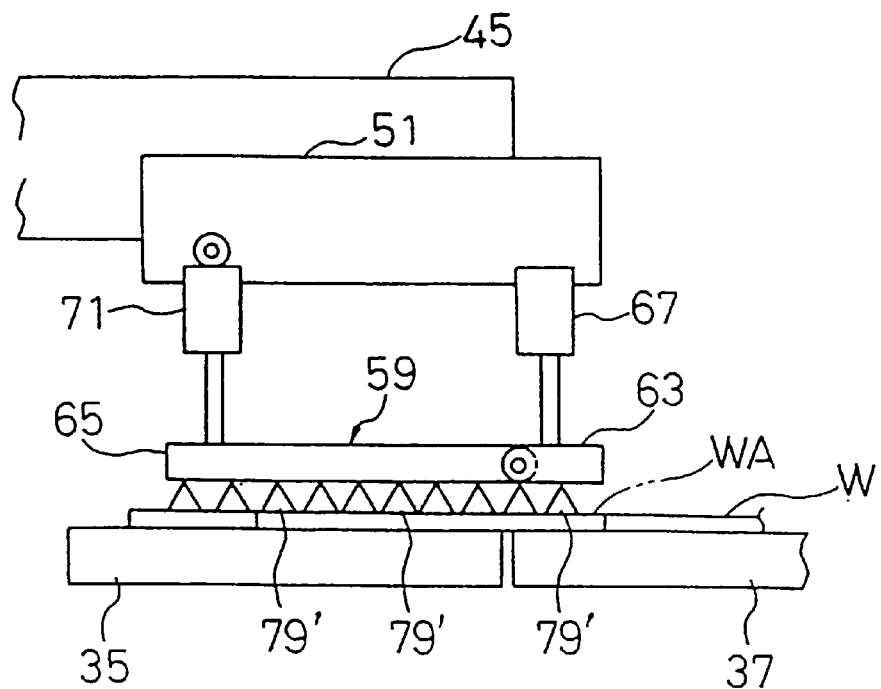

After the upper surface of the punched product WA has been sucked by the vacuum pads 79' in the vicinity of the gravity center thereof, only the second actuation cylinder 71 is actuated to move only the pivotal lift arm 65 upward so that the pivotal lift arm 65 can be pivoted clockwise to bend only the left side of the punched product WA upward, as shown in FIG. 6C.

Figure 6D:
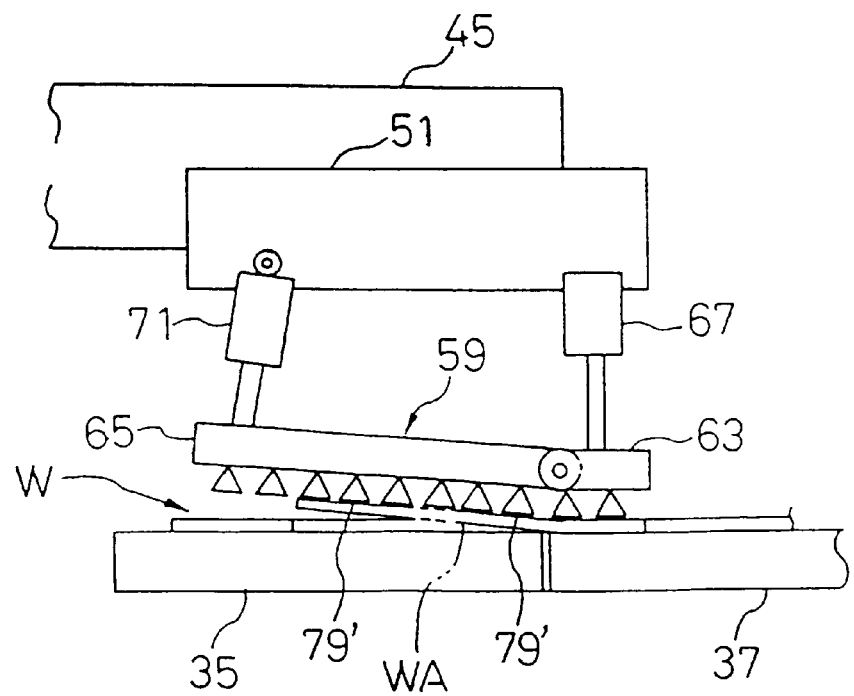

After that, the punched product WA is separated upward from the plate material W perfectly by actuating both the first and second actuation cylinders 67 and 71 at the same time, as shown in FIG. 6D.

Figure 6E:
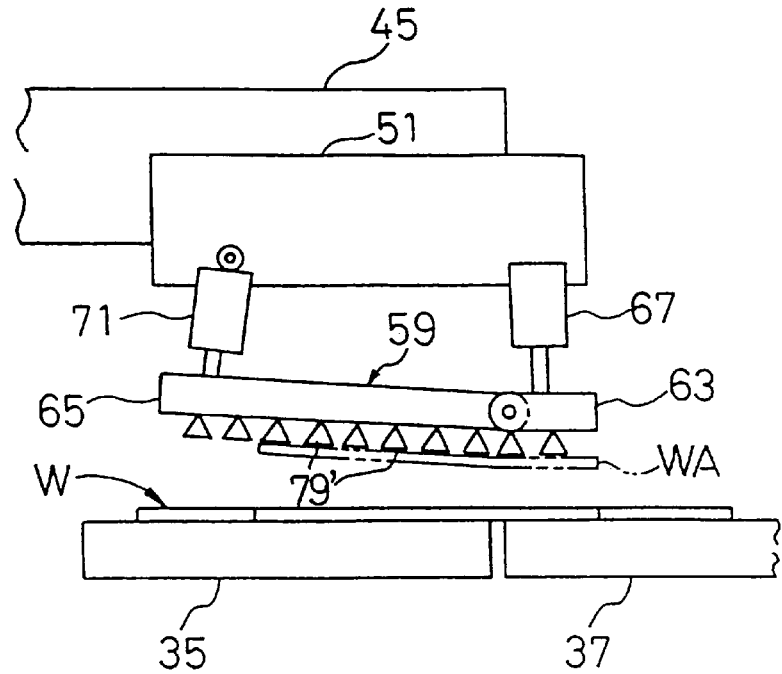
Figure 6F:
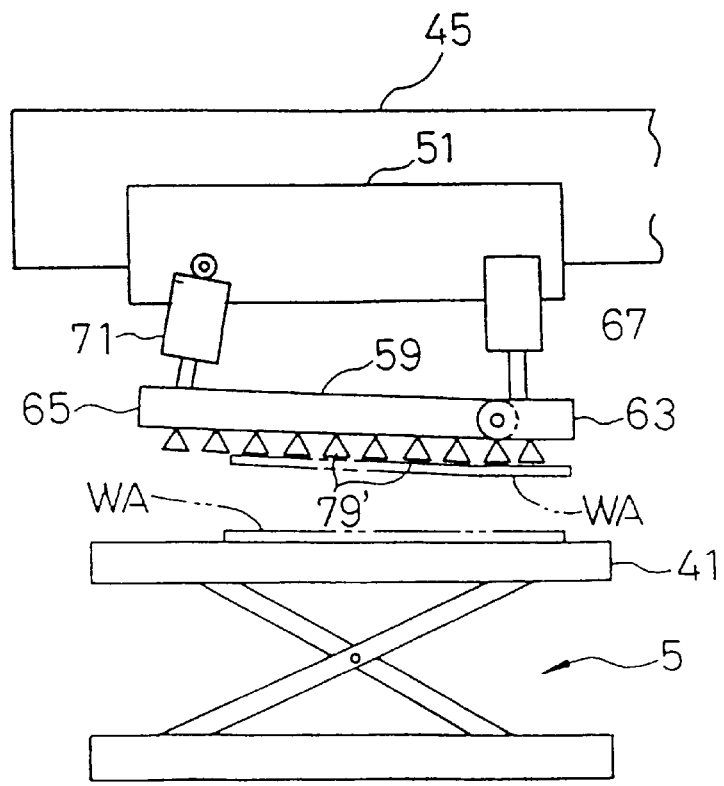

After the punched product WA has been lifted upward, the mobile motor 55 is driven to move the slider 51 in the X-axis direction from over the punch press machine 3 to over the product support unit 5, as shown in FIG. 6E.

Further, only the second actuation cylinder 71 is deactuated to lower only the left side of the punched product WA so that the punched product WA can be kept horizontally. Further, both the first and second actuation cylinder 71 are further deactuated to further lower the punched product WA, so that the punched product WA can be mounted on the punched product support unit 5. Under these conditions, the pad control section 99 releases the vacuum pads 79' into the non-suction status, and further the slider 51 is lifted by actuating the first and second cylinders 87 and 71 at the same time, as shown in FIG. 6F, so that the lift arm 63 or the vacuum pads 79 are moved upward away from the punched product WA mounted on the punched product support unit 5.

As described above, in the punched plate material carrying-out system according to the present invention, since the vacuum pads 79 can suck only the vicinity of the punched product WA, irrespective of the shape and the size of the punched product WA, it is unnecessary to arrange a great number of vacuum pads $79_1, 79_2, \ldots, 79_n$ both in the X- and Y-axis directions in a wide range so as cover all over the upper surface of the product WA of the maximum size. As a result, it is possible to reduce the number of vacuum pads 79 and simplify the punched product carrying-out unit 7, thus reducing the cost thereof. In particular, since the slider 51 and the guide member 45, etc. can be compacted, it is possible to reduce the size of the entire punched plate material (product) carrying-out system, thus economizing the installation space required for the system in a factory.

In addition, after the upper surface of the punched product WA has been sucked in the vicinity of the gravity center thereof, the left side of the punched product WA is further bent or curved upward, the punched product WA can be separated from the plate material W easily, so that it is possible to improve the working efficiency of the punched product carrying-out work for the plate material processing machine.

What is claimed is:

1. A method of carrying-out a product punched out by a punch press machine, comprising:

punching out a plate material to manufacture a punched product;

moving a slider, said slider including a lift arm vertically movably supported by first and second cylinders and further having a plurality of vacuum pads, from a punched product support position to a punched product carry-out position near the punch press machine;

providing product manufacturing data of punched products to provide a basis of such product manufacturing data;

calculating a gravity center of the punched product on the basis of the product manufacturing data;

recognizing a shape of the punched product on the basis of the product manufacturing data to provide a basis of the recognized shape of the punched product;

moving the punched product in both X- and Y-axis directions by an X- and Y-axis locating mechanism of the punch press machine, so that the gravity center of the punched product is located just under at least one of the vacuum pads arranged on a bottom surface of the lift arm;

discriminating which vacuum pads are located over the punched product on the basis of the recognized shape of the punched product;

actuating the first and second actuation cylinders to lower the lift arm so that vacuum pads are brought into contact with an upper surface of the punched product;

actuating the first and second actuation cylinders to move the lift arm upward away from the plate material; and moving the slider away from the punched product carry-out position to the punched product support position.

2. The method of carrying-out the product punched out by the punch press machine of claim 1, wherein the gravity center of the punched product is located under at least one of the vacuum pads so that at least one of outermost vacuum pads can hold an outermost end of the punched product as seen along the X-axis direction.

3. The method of carrying-out the product punched out by the punch press machine of claim 1, wherein after the vacuum pads located over the punched product are discriminated, the punched product is moved in both X- and Y-axis directions by the X- and Y-axis locating mechanism of the punch press machine, so that the gravity center of the punched product is located just under at least one of the vacuum pads arranged on the bottom surface of the lift arm.

4. The method of carrying-out the product punched out by the punch press machine of claim 1, wherein after the slider has moved from the punched product support position to the punched product carry-out position, the plate material is punched out to manufacture the punched product.

5. The method of carrying-out the product punched out by the punch press machine of claim 1, wherein after only the vacuum pads located just over the punched product have been actuated so as to hold the punched product, the first and second actuation cylinders are actuated to lower the lift arm so that the vacuum pads are brought into contact with an upper surface of the punched product.

6. The method of carrying-out the product punched out by the punch press machine of claim 1, wherein only the second actuation cylinder is actuated by a larger stroke to bend one end of the punched product upward relative to the plate material while moving the lift arm upward away from the plate material, for easy separation of the punched product from a remaining flat plate material.

7. The method of carrying-out the product punched out by the punch press machine of claim 1, which further comprises:

moving the slider which holds the punched product by the vacuum pads via the lift arm, to a punched product support unit installed at the punched product support position; and deactuating the vacuum pads to release the carried punched product onto the punched product support unit.

* * * * *